United States Patent [19]
Steber et al.

[11] Patent Number: 4,811,250
[45] Date of Patent: Mar. 7, 1989

[54] DEVIATION MEASUREMENT SYSTEM

[75] Inventors: George R. Steber, Mequon; Michael Mondloch, Brown Deer, both of Wis.

[73] Assignee: Applied Power Inc., Butler, Wis.

[21] Appl. No.: 858,662

[22] Filed: May 2, 1986

[51] Int. Cl.[4] .......................... G01B 5/24; B21C 51/00
[52] U.S. Cl. .................... 364/551; 364/559; 33/288; 33/608; 72/34; 72/705
[58] Field of Search ............... 364/550, 551, 561, 559; 72/32, 34, 705; 73/769; 33/288, 502, 608

[56] References Cited

U.S. PATENT DOCUMENTS

| | | |
|---|---|---|
| Re. 31,000 | 7/1982 | LeGrand et al. .................... 33/608 |
| 3,176,263 | 3/1965 | Douglas . |
| 3,590,623 | 7/1971 | Hunnicutt et al. .................... 72/302 |
| 3,731,273 | 5/1973 | Hunt .................................... 340/16 |
| 3,793,736 | 2/1974 | Cufrini ............................. 33/203.17 |
| 3,821,469 | 6/1974 | Whetstone et al. .................. 178/18 |
| 3,838,212 | 9/1974 | Whetstone et al. .................. 179/18 |
| 3,875,381 | 4/1975 | Wingfield et al. ............... 235/151.3 |
| 3,924,450 | 12/1975 | Uchiyama et al. ..................... 73/67 |
| 3,937,067 | 2/1976 | Flambard et al. ................... 73/67.7 |
| 4,035,762 | 7/1977 | Chamuel ...................... 340.11/16 R |
| 4,055,061 | 10/1977 | Bayorgeon et al. ................... 72/32 |
| 4,096,755 | 6/1978 | Hause et al. .......................... 73/798 |
| 4,097,157 | 6/1978 | Lill ...................................... 356/152 |
| 4,174,623 | 11/1979 | LeGrand et al. ................ 33/608 X |
| 4,231,260 | 11/1980 | Chamuel ............................... 73/597 |
| 4,276,622 | 6/1981 | Dammeyer .......................... 367/118 |
| 4,319,402 | 3/1982 | Martin ................................... 33/608 |
| 4,342,154 | 8/1982 | Legrand ............................... 33/608 |
| 4,344,234 | 8/1982 | Lill et al. ............................. 33/228 |
| 4,357,672 | 11/1982 | Howells et al. .................... 364/561 |
| 4,446,480 | 5/1984 | Breglia et al. ................. 364/559 X |
| 4,492,471 | 1/1985 | Wiklund ............................. 356/375 |
| 4,523,468 | 6/1985 | Derkacs et al. ...................... 73/798 |
| 4,536,962 | 8/1985 | Hense et al. ......................... 33/516 |
| 4,549,359 | 10/1985 | Hense et al. ......................... 33/516 |
| 4,578,870 | 4/1986 | Cooke .............................. 33/608 X |
| 4,589,079 | 5/1986 | Peter .................................... 364/551 |
| 4,598,481 | 7/1986 | Donahue ............................... 33/288 |
| 4,639,878 | 1/1987 | Day et al. ....................... 364/571 X |
| 4,643,015 | 2/1987 | Larson et al. .................... 72/705 X |

Primary Examiner—P. S. Lall
Assistant Examiner—Joseph L. Dixon
Attorney, Agent, or Firm—C. Thomas Sylke; John C. Cooper, III; Fred Wiviott

[57] ABSTRACT

A system is disclosed for determining the positions of a set of points on a body and comparing those points to a set of reference points. The system includes a data acquisition apparatus comprised of emitters, receivers, and microprocessor controls. The emitters are mounted at various predetermined positions on the body, for example a vehicle body or frame, and triggered in an optimal fashion by the microprocessors. Triggering generates a single acoustic burst signal from an emitter. An array of microphones acts as the receiver. After generation of the signal, the microprocessor initializes an external clock which measures the travel time of the signal from the emitter to the receivers. By repeating this process a number of times, data is acquired which yields the three-dimensional coordinates of a given point when processed by a microprocessor. Microprocessors further convert this data into a form that can be used by the overall system to determine the positions of all points measured on the vehicle body or frame. The data is transmitted to an operator display unit where it is plotted graphically. Reference data is inputted into the operator display unit via an optical decoder. This data and a comparision of the two sets of data is displayed. Based on the data comparison, the operator can then determine whether and to what extent repair work or further maintenance work on the automobile body, frame or wheels is necessary.

35 Claims, 7 Drawing Sheets

DEVIATION MEASUREMENT SYSTEM

BACKGROUND OF THE INVENTION

1. Field of the Invention

The present invention relates generally to the art of establishing the three-dimensional positions of a set of points on a body with contactless measuring means, and more particularly to a system for determining the deviation of a set of points from a set of reference points in a three-dimensional cartesian coordinates system. Once these positions have been determined, they are either numerically or graphically compared to a set of reference points. Even more particularly, the system may be used in conjunction with motor vehicle repair and maintenance, for example body or frame straightening and repair or wheel alignment, to compare the actual position of certain points on the vehicle to the manufacturer's specifications for that vehicle.

2. Description of the Related Art

It is frequently necessary to know the actual position of a point on a body relative to the desired position of such a point. This is particularly true with regard to motor vehicle repair and maintenance. A system that could detect a discrete set of points on a vehicle body or frame element and compare the actual positions of those points to their desired positions would be helpful in such operations as body repair, frame straightening and wheel alignment.

In particular, in detecting and correcting defects in a vehicle frame, a straightening rack is often used. For example, such a rack may consist of chains, cables or other means attached to hydraulic cylinders and to the vehicle frame to push and/or pull the frame back into its proper configuration. Examples of such devices are shown in U.S. Pat. No. 3,590,623 issued to Hunnicutt et al. on July 6, 1971, and reissued U.S. Pat. No. Re. 31,000, issued to LeGrand et al. on July 27, 1982.

Examples of wheel alignment systems that would benefit from incorporating the present system are U.S. Pat. No. 3,793,736 issued to Cufrini on Feb. 26, 1974, U.S. Pat. No. 4,097,157 issued to Lill on June 27, 1978 and U.S. Pat. No. 4,344,234 issued to Lill et al. on Aug. 17, 1982.

With respect to means used to acquire measurement data there are no such systems known to applicant in the auto body and wheel alignment art which employ acoustic measuring techniques. However, many methods and means have been disclosed in prior patents for distance measurement. A number of such devices require direct physical contact between the measuring means and the point whose position is to be determined. Several of these devices mechanically measure the position being touched by a probe, as in U.S. Pat. No. 4,536,962 issued to Hense et al. on Aug. 27, 1985 and U.S. Pat. No. 4,549,359 also issued to Hense et al. on Oct. 29, 1985. Other devices require physical contact to provide a conductive path for a travelling signal. In U.S. Pat. Nos. 4,035,762 and 4,231,260 issued to Chamuel on July 12, 1977 and Nov. 4, 1980, respectively, a delay element acts as the medium for a measuring signal. The position of the measured point is determined by measuring the phase shift in the travelling signal.

These devices all suffer the same shortcomings. If readings are to be taken more than once, when straightening an auto frame, for example, the delay element or other position sensor must be positioned identically a number of times. In addition to the potential inaccuracy, it is time consuming to have to reposition the element or sensor for every point each time a new reading is to be taken. A device that avoids these problems would be an important improvement.

Several devices incorporating contactless measuring means have been developed. One such device is described in U.S. Pat. No. 3,176,263 issued to Douglas on Mar. 30, 1965. Douglas generally shows a drape of small explosives over the body of the object to be measured. Surrounding the area of the body are a number of microphones. The small explosive charges are detonated and the response times measured by the microphones. By compiling and processing the times measured by the microphones, the general shape of the body and its proportions can be measured and recorded. The system as disclosed by Douglas would be impractical for purposes of measuring and recording positions on an auto body or frame since the explosions would, no doubt, have an adverse effect on the paint and structure of the body. In addition, a new drape of explosive charges would be required for each reading, which would be totally impractical.

Another contactless measuring device is shown in U.S. Pat. No. 3,731,273 issued to Hunt on May 1, 1973. The Hunt patent shows a mechanical triggered spark gap which is contained in a probe shown in FIG. 5 of Hunt. To measure a a given position, one places the spark gap at the tip of the probe at the point to be measured. By applying pressure to the probe, physical contact between electrical leads is made allowing a spark to be generated. The travel time of the acoustic wave is measured by two microphones and the position calculated. Several problems are encountered with the Hunt device, However. First, the spark gap must be mechanically and physically triggered. This means applying pressure to the probe which may dislocate the probe a slight distance. In a system measuring small distances, such as applicants' system, such dislocation could easily be greater than the accuracy of the device. Second, the device shown in Hunt requires that the spark gap be located at the position to be measured. Therefore, a point which is inaccessible to the probe's spark gap or which is not able to be accurately measured by such a configuration, cannot be measured by the device shown in Hunt. Finally, Hunt suffers from one other deficiency. If a number of measurements are to be taken at the same point while the body measured is moving or changing shape, the Hunt device does not provide for a consistent and accurate means of measuring the identical point a number of times.

U.S. Pat. No. 3,821,469 issued to Whetstone et al. On June 28, 1974 shows another device for measuring the position of a point in space. Whetstone uses a stylus similar to the probe found in Hunt and a series of orthogonally positioned receptors. The device shown in Whetstone requires that the receptors define the entire space throughout which the stylus moves. This obviously is an impractical restriction on the device if it is to be used to measure along the length, width and depth of an automobile or truck body or frame.

U.S. Pat. No. 3,924,450 issued to Uchiyama et al. on Dec. 9, 1975 also shows a device for measuring three-dimensional coordinates. The device shown uses a supersonic oscillator to generate a signal to be timed. The signal is generated at a point P and is received at at least three points, A, B and C. Uchiyama does not disclose the means or method for converting or for measuring the travel time of a continuous supersonic wave. The known methods for accomplishing this suffer from the same shortcoming. The accuracy available with such a system is extremely poor when compared with the digital systems used in applicants' device. Because the device disclosed is used for measuring models of large scale operations, such as marine engine rooms and land-base plants, the accuracy is not as important and, therefore, the high resolution required in applicants' device is not considered important in the area of art addressed by Uchiyama.

In U.S. Pat. No. 3,937,067 issued issued to Flambard et al. on Feb. 10, 1976, a device is disclosed that is used to measure angular displacements. Flambard uses the reflective properties of an ultrasonic wave to measure displacement. This technique is naturally not desirable, applicable or practical in applicants' system where any reflection will only distort the measurement of the travel time.

Another patent showing a distance measuring scheme is U.S. Pat. No. 4,276,622 issued to Dammeyer on June 30, 1981. Dammeyer generally shows a circuit used to measure the distance between an ultrasonic transmitter and an ultrasonic receiver. The transmitter generates an ultrasonic energy burst in response to an energizing signal. The receiver receives the ultrasonic burst and generates a detection signal in response thereto. While the ultrasonic signal is in transit, a ramp generator is activated, allowing a capacitor to linearly charge for a period of time. The distance the signal travelled is therefore in direct proportion to the accumulated voltage potential of the capacitor, in this case capacitor C5 in FIG. 4. The rate of potential increase is controlled by adjusting resistor R10. The method used by Dammeyer, while providing a coarse measurement of distance, suffers, as does uchiyama, from the fact that the analog signals used are only a rough approximation when compared to those available with digital circuitry and suffer from both time and temperature dependency. Therefore, while the measured potential of capacitor C5 is representative generally of the distance covered by the ultrasonic signal, it does not approach the accuracy and resolution possible with the digital circuit and software employed by applicants in their invention.

Finally, U.S. Pat. No. 4,357,672 issued to Howells et al. on Nov. 2, 1982, discloses another distance measuring apparatus using acoustic signals. During the transit time of an acoustic signal, a microprocessor counts the number of instruction cycles it executes, thereby generating a count which is generally indicative of the amount of time the acoustic signal takes to travel from the stylus to the microphone. In the claims and specification, however, Howells specifically states that the timing mechanism will be the internal instruction count of the microprocessor. He states that no additional clock or scaler is necessary to operate the system. He thus limits the accuracy and resolution of the system by limiting the timing frequency to the execution timing of instruction cycles.

There are a number of other acoustical devices which may be used to detect defects in various objects. These devices base their calculations on different arrival times of a signal reflected off of a defect in an object. Therefore, many of the principles used to construct and use such devices are inapplicable to a system in which no reflection is desired and a homogeneous transit medium is required. Examples of such devices include U.S. Pat. No. 3,875,381 issued to Wingfield, deceased et al. on Apr. 1, 1975; U.S. Pat. No. 4,096,755 issued to Hause et al. on June 37, 1978; and U.S. Pat. No. 4,523,468 issued to Derkacs et al. on June 18, 1985.

OBJECTS AND SUMMARY OF THE INVENTION

It is a primary object of the present invention to provide a system for accurately determining the positions of a number of points on or in an object.

It is a further object of the present invention to provide a system for determining the positions of a set of points on or in a vehicle body chassis or frame and comparing these measured positions to a set of reference positions.

It is another object of the present invention to provide a system which operates in real time and can be repeatedly operated to provide the operator of the system with feedback regarding the change in position of any of the points being measured.

It is yet another object of the present invention to provide a system for measuring positions of a set of points which provides higher resolution and greater accuracy than the systems found in related areas of the art.

It is still another object of the present invention to provide a system for measuring a set of points which can consistently yield a number of accurate readings on the identical point on or in a body regardless of the position of said point or movement of the point.

Another object of the present invention is to provide a system which will graphically or numerically illustrate and compare for the operator the deviations of the measured set of points from the set of reference points.

Still another object of the present invention is to provide a system which can be incorporated in the procedure for repair and maintenance of vehicle bodies with respect to unibody or frame straightening and/or wheel alignment. Therefore, the system must be compatible with the environment of the body shop or repair garage.

Still another object of the present invention is to provide a system which does not require calibration to account for discrepancies in the propagation velocity through the medium in which the measurements are taken.

A different object of the present invention is to provide a system which can be adapted to measure and compare actual body, wheel or frame conditions to a number of model specifications.

How these and other objects of the invention are accomplished will be described by reference to the following description of certain preferred embodiments of the invention taken in conjunction with the FIGS. Generally, however, the objects are accomplished in a system for determining the positions of a set of points on a vehicle and comparing those points to a set of reference points provide by the vehicle manufacturer or other source. The system includes a data acquisition apparatus comprised of emitters, receivers, and microprocessor control means. The emitters are mounted at various predetermined positions on the vehicle body or frame and are triggered in an optimal fashion by the microprocessors. Triggering causes a spark to be generated on each of the emitters which in turn generates a single acoustic burst with a definite wavefront. An array of microphones acts as the receiver. After generation of the spark and resulting acoustic wavefront, the microprocessor initializes an external clock which measures the travel time of the pulse wavefront from the emitter post to the microphone receivers. By repeating this process a number of times, data can be acquired which will yield the three-dimensional coordinates of a given point in space when processed by the microprocessor. The microprocessors further convert this data into a form that can be used by the overall system to determine the positions of all points measured on the vehicle body or frame. The data is transmitted to an operator display unit where it is either plotted graphically or displayed numerically in tabular form for the operator. Reference data, provided by specifications of the manufacturer or independently determined, is also inputted into the operator display unit via an optical decoder or other data input device. This data appears in either graphical or numerical form with the measured data and thus provides a comparison of the two sets of data. Based on the graphical or tabular data comparison, the operator can then determine whether and to what extent repair work or further maintenance work on the automobile body or frame is necessary. Other variations, applications, or modifications of the system may appear to those skilled in the art after reading the specification and are deemed to fall within the scope of the present invention if they fall within the scope of the claims which follow the description of the preferred embodiment.

DESCRIPTION OF THE PREFERRED EMBODIMENT

Figures 1A, 1B:
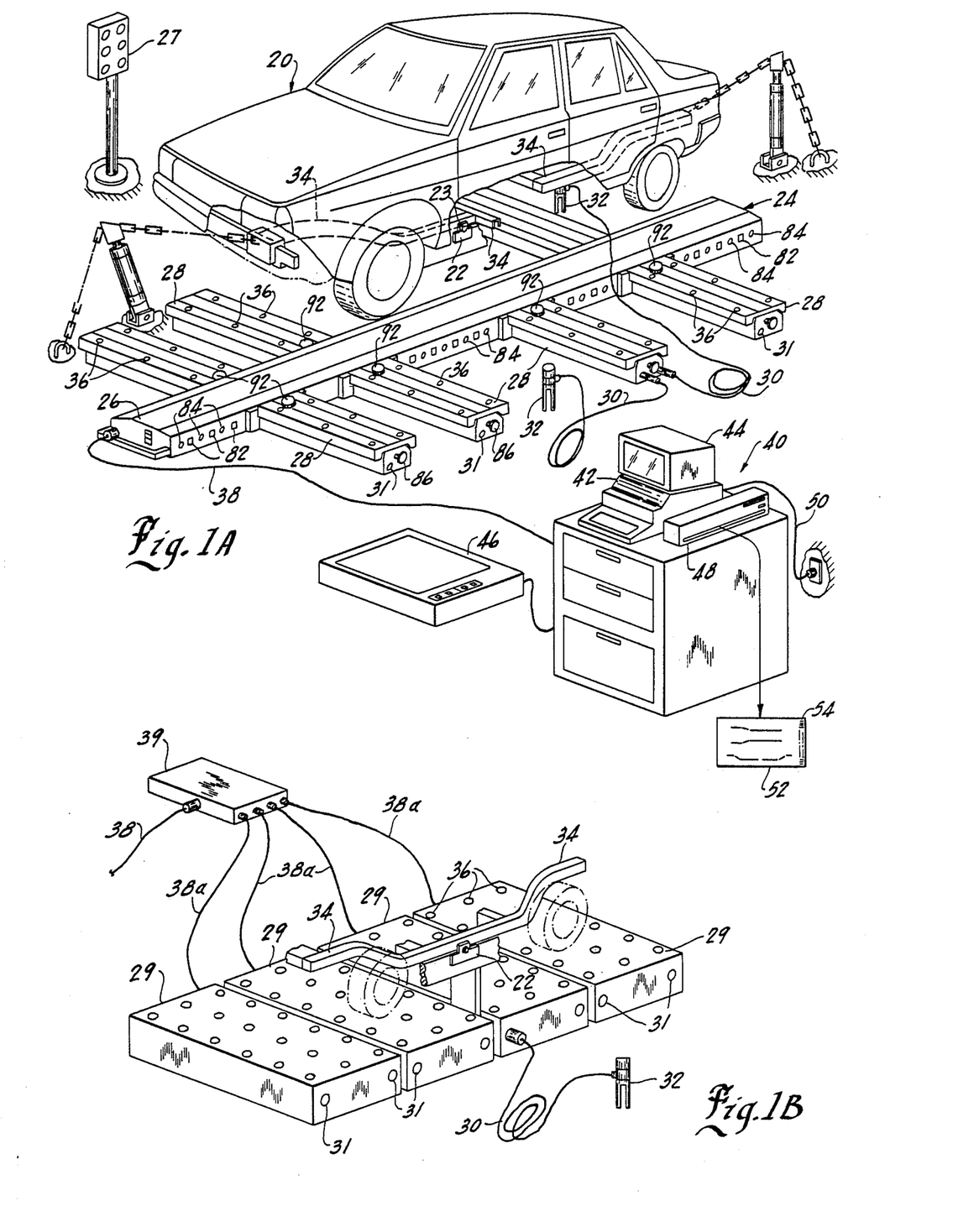
FIG. 1A is a perspective view of a vehicle mounted on a frame straghtening rack incorporating the preferred embodiment of the present invention.
FIG. 1B shows an alternate embodiment of the data acquisition means of the present invention.

The preferred embodiment of the present invention is shown in FIG. 1A. A vehicle 20 is positioned on a body or frame straightening rack 22 and held on rack 22 by pinch clamp 23. The specific type of rack with which the present invention is used is not essential to the invention and is therefore illustrated in schematic form only. Located immediately beneath vehicle 20 is a collector bridge 24. Collector bridge 24 generally includes a central beam 26 and adjustable arms 28. In addition to the arms 28, the system may incorporate a number of array towers 27, one of which is shown in FIG. 1A. Array tower 27 gives the system the ability to measure positions found higher on the vehicle or inaccessible to an arm located below the vehicle 20. The tower 27 is essentially identical in operation to that of the arms 28. Therefore, any description of arms 28 is equally descriptive of tower 27. Cables 30 attach arms 28 to a number of emitter posts 32. Emitter posts 32 are mounted to the vehicle frame 34 in FIG. 1A. It should be noted that the system disclosed herein may be used to take measurements on a vehicle body, frame, unibody and/or chassis to obtain both upper and lower body measurements, and therefore reference to a vehicle frame is not to be limiting in that respect. Also mounted on each arm 28 is an array of microphones 36. Collector bridge 24 is connected by cable 38 to an operator display unit 40.

Operator display unit 40 includes a central processing unit (CPU) 42, a cathode ray tube video screen (CRT) 44, a printer 46 and an optical code reader 48. Power for the entire system is supplied by power cable 50 via CPU 42. The reference data for the system and a given model and year of vehicle is inputted by a data sheet 52 into the CPU via optical code reader 48.

General System Configuration

Initially, vehicle 20 is mounted above collector bridge 24. It is important to note that the vehicle 20 does not directly touch bridge 24 at any time. In an alternate embodiment of collector bridge 24 to be described below, the bridge configuration may be replaced by a set of miniature, portable collector arrays 29, as seen in FIG. 1B. The alternate configuration of FIG. 1B uses portable arrays 29 instead of the arms 28 to hold a number of microphones 36. Like the arms 28, portable arrays 29 have sockets 31 for plugging in cables 30. Arrays 29 can be utilized in situations where a permanent or anchored bridge 24 is impractical. Each portable array 29 is connected by a cable 38a to the operator display unit 40 via junction box 39 and cable 38. Once the vehicle 20 is properly mounted, the reference data is read into the CPU 42 by optical code reader 48. The data is provided by an optical code 54 on data sheet 52. The operator selects a set of control points on the vehicle 20 which act as the basis for the locus of measured position points on the vehicle 20.

Emitter posts 32 are attached adjacent to the positions to be measured. Posts 32 generate a number of sparks which result in acoustic signals. Time measurements of these signals are made utilizing the microphones 36 and subsequently yield the three-dimensional coordinates of each point to which an emitter post 32 is attached. These coordinates are generated by CPU 42 after the time measurements are processed by microprocessors to be described below. The measurements are transferred via cable 38 to the CPU 42. There they are further processed and compared to the set of reference points obtained from data sheet 52. The comparison may be in either graphical or numerical tabular form and may be displayed on CRT 44 or a hard copy may be created on printer 46.

If, for example, the operator is straightening a damaged vehicle frame, as seen in FIG. 1A, the displayed comparison gives the operator information needed to make the next adjustment to the frame 34. By frequently generating the comparison, the operator receives, constant, real time feedback on the status of the repair process. The actual repair operations are accomplished using rack 22 in its normal fashion, i.e. by pushing or pulling on certain components of the vehicle, all as described in several of the aforementioned frame straightening patents and as is generally well known in the art.

Data Acquisition Means

Figure 2A:
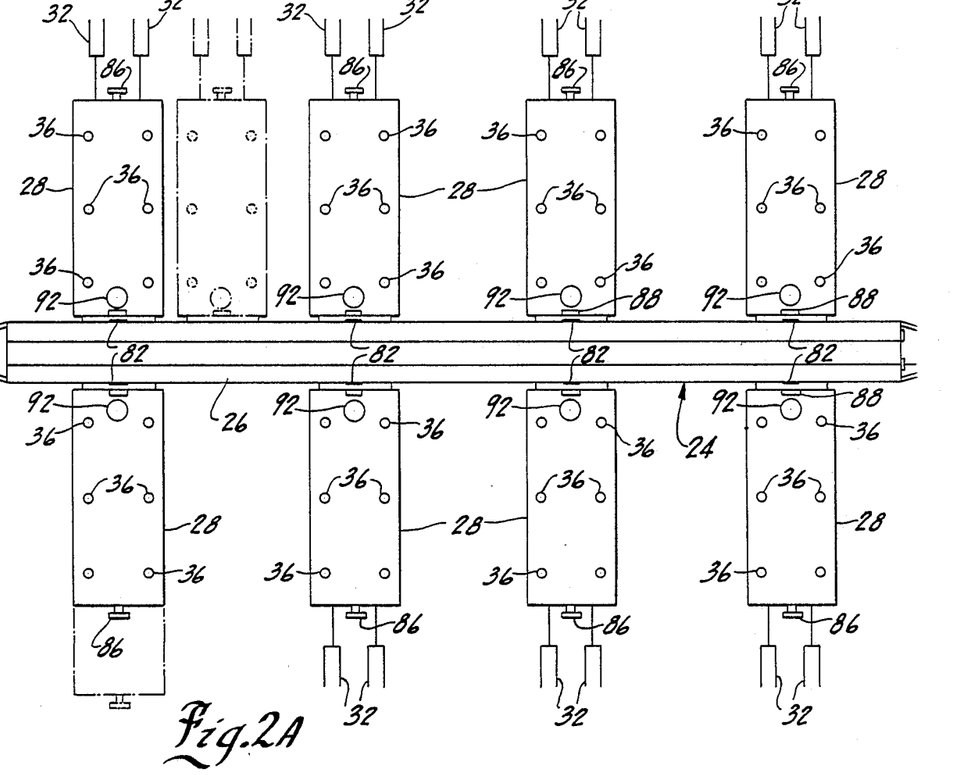
FIG. 2A is a top plan view of the collector bridge of the preferred embodiment of the present invention.
Figure 2B:
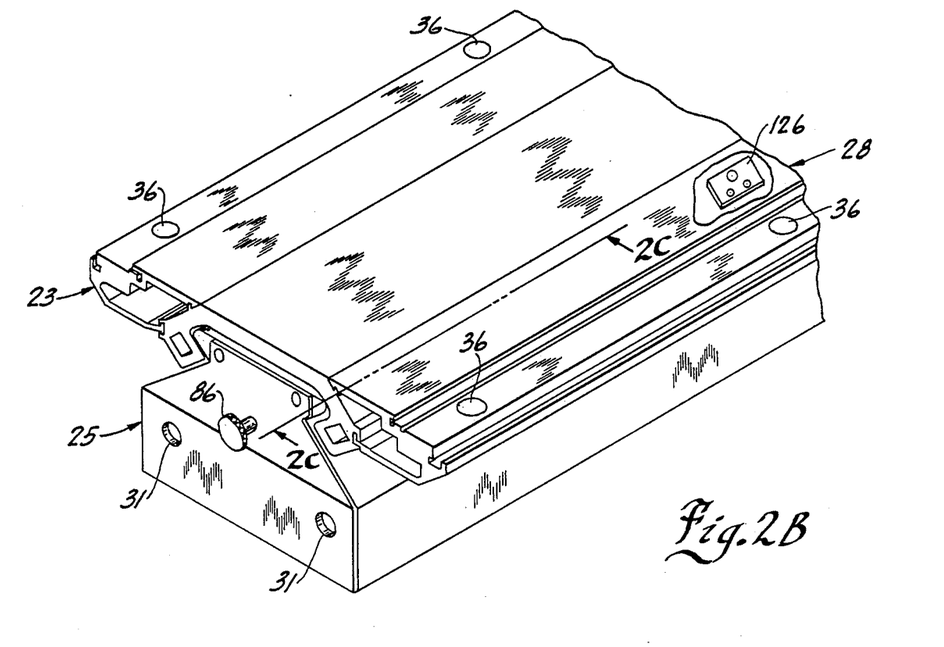
FIG. 2B is an expanded perspective view of an arm of the collector bridge of FIG. 2A.

The data acquisition means generally consists of the collector bridge 24 and its accessories. The bridge 24 and its arms 28 can be seen in detail in FIG. 2A and 2B. The center beam 26 is comparable to the length of a vehicle body, in the preferred embodiment approximately 3 meters. As can be seen in FIG. 2A, the collector bridge 24 includes 8 arms 28 in the preferred embodiment. Each arm 28 extends transversely from the beam 28 and is slidable therealong. As seen in FIG. 3B, which illustrates a single data acquisition channel within arm 28, there is a central controller 56 for each arm 28. Controller 56 consists of a microprocessor 58 and an external clock generator 64. Each arm 28 has one such controller 56. In the preferred embodiment, each arm 28 also has 6 microphones 36 embedded therein. A given microphone 36 is connected to the controller 56 for the arm 28 in which it is located via signal channel 66. Channel 66 consists of a microphone excitation source 68, a noise filter 69, a voltage amplifier 70, a high speed comparator 72, a count control flip-flop 60 and a 16-bit counter 62. The counter 62 of each channel 66 and the clock 64 of controller 56 are used in synchronous operation. The operation of all of these elements will be explained below. There are 6 signal channels 66 and one controller 56 in each arm 28 in the preferred embodiment. The noise filter 69 acts to sift out ambient background noise that is received along with the shock wave. The filter 69 acts as a band pass in the preferred embodiment so that acoustic wave energy not generally matching the frequency profile of the shock waves generated by gaps 80 does not pass through filter 69. There is in turn a communication port 74 connecting each microprocessor 58 to the operator display unit 40 via cable 38.

Cable 30 connects the trigger output of the microprocessor 58 to an emitter pod 76 which is one of two mounted on the emitter post 32. In the preferred embodiment of the system, the emitter pod 76 consists of a high voltage power supply (not shown) and a capacitive-discharge circuit (also not shown). The emitter pod 76 is linked to primary spark coil 78 which, in the preferred embodiment is a transformer with a 1:30 ratio. The secondary coil of the transformer is connected to a spark gap 80. Alternately, the spark coils may be replaced by other means for generating a high voltage across spark gap 80.

In the preferred embodiment of the invention, there are two emitter pods 76 connected to the triggering output of the microprocessor 58 and six microphones 36 with their accompanying signal conditions 66. The controller 56 is capable of controlling which emitter pod 76 is triggered and knowing from which microphone 36 signals are received.

Figure 2C:
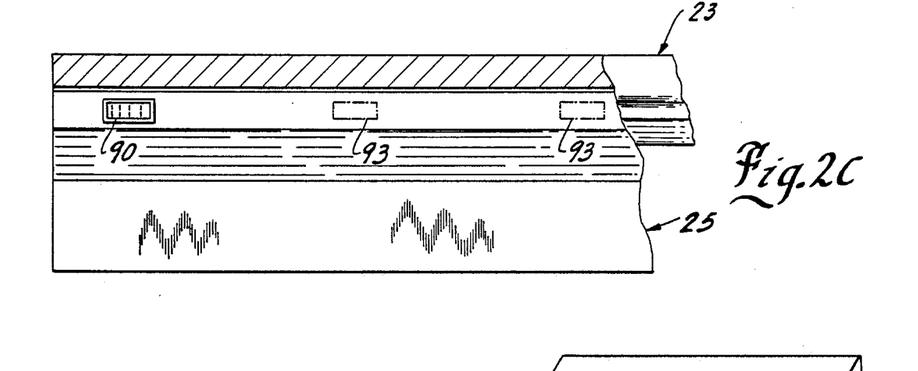
FIG. 2C is a cross-section of a collector bridge arm taken along the line 2C—2C of FIG. 2B.

The exact positions of coplanar microphones 36 must be known for the data acquisition means to work properly. Any suitable means for determining and communicating the positions of the microphones may be employed. In the preferred embodiment, a series of position sensors provide the microprocessor 58 with exact two dimensional coordinates for each of the arms 28. In the preferred embodiment, all of the microphones 36 are situated on the same coordinate plane. In an alternate embodiment, this coplanar configuration is unnecessary because the system has vertical position sensors. On beam 26 of the collector bridge 24 in the preferred embodiment are a number of longitudinally spaced optical position indicators 82. There are also corresponding holes 84 between the sensors 82. Each arm 28 has, extending through it, a setting pin 86 the end of which fits into a hole 84. In the preferred embodiment, the indicators 82 are spaced 50 millimeters apart. Thus, as the arms 28 are moved longitudinally, optical readers 88 (seen in FIG. 2A) within each arm 28 feed the longitudinal position into the microprocessor 58 in each arm 28. Similarly, there are transverse position sensors 90 in the upper segment 23 of the arms 28, as seen in FIG. 2C. As with beam 26, there are holes in lower arm segment 25 into which pin 92 fits, thus locking upper arm segment 23 into place. Adjacent each such hole is a position indicator 93 which provides the microprocessor 58 with transverse position data. In the preferred embodiment, position data is generated using an optical system. The transverse locking positions are 100 millimeters apart in the preferred embodiment as seen in FIG. 2C.

In the preferred embodiment, the spacing between microphones 36 is 180 millimeters. Therefore, by knowing the position of the arms 28 relative to stationary beam 26 and the position of microphones 36 on each arm 28, the precise position of each microphone 36 is known.

Figures 4A, 4B:
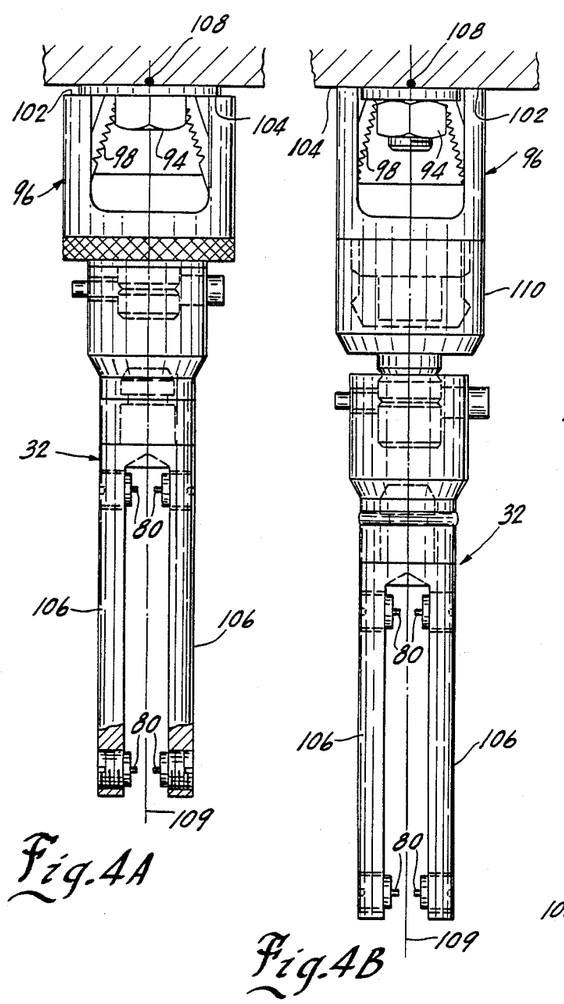
FIG. 4A is a side view of a standard emitter post of the preferred embodiment of the present invention utilizing a mounting attached to a nut.
FIG. 4B is a side view of the emitter post of FIG. 4A using an added swivel element.

The emitter posts 32 are the other major components of the data acquisition means. Different mountings for the emitter posts 32 of the preferred embodiments are shown in FIGS. 4A-4E. FIG. 4A shows one means for mounting a post 32 to a nut 94. Mounting 96 is attached to nut 94 with a set of teeth 98. Mounting 96 is secured by tightening teeth 98 around nut 94 by an appropriate mechanical means, such as a screw. End piece 102 must be kept in contact with surface 104 for a reason to be discussed below. Mounting 96, and the other related mounting element 97, will ensure that the emitter 32 will generate signals from the identical point each time that point is polled by the system. The post 32 itself is snapped onto the mounting by appropriate means. In FIGS. 4A-4E, post 32 consists of two supports 106 between which are found identical spark gaps 80. Spark gaps 80 generally are positioned so that the two centers of the gaps 80 define a line 109 passing through the point 108 to be measured. The reason for this will be described below.

Figure 4C:
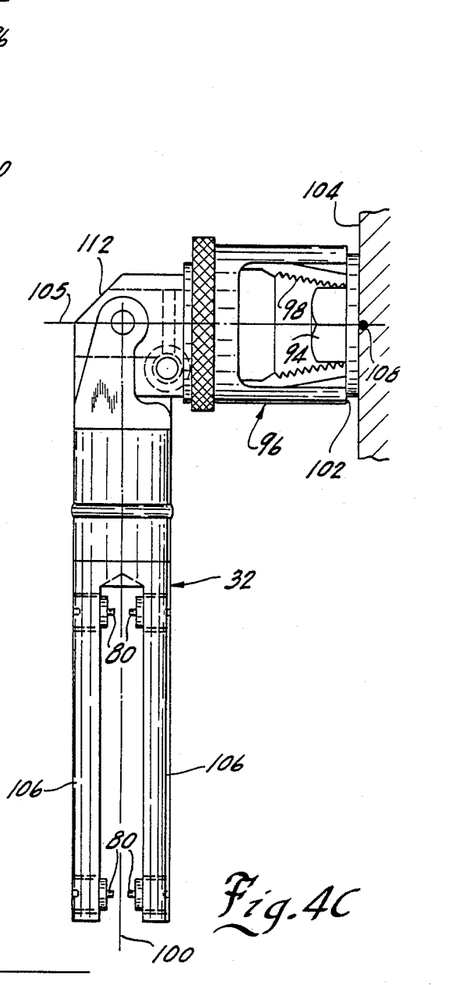
FIG. 4C is a side view of the emitter post of FIG. 4A using an added knee element.

FIGS. 4B-4G show other emitter post configuraions. In FIG. 4B, the post 32 has a swivel element 110 connecting it to the mounting 96. This swivel element 110 permits rotational adjustment of the spark gaps 80 to provide a clear path between the gaps 80 and receiver microphones 36. FIG. 4C shows a knee element 112 that permits mounting the gaps 80 so that the line 100 that they define is parallel to surface 104 rather than perpendicular thereto. Line 100 is perpendicular toline 105 which is also perpendicular to surface 104 and passes through point 108. As with the swivel 110, knee 112 is used to ensure a clear path from each spark gap 80 to the appropriate microphones 36.

Figure 4D:
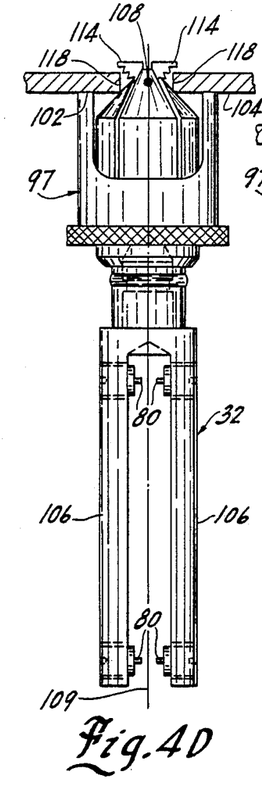
FIGS. 4D and 4E are side views of standard emitter posts mounted to holes of differing diameters.
Figure 4E:
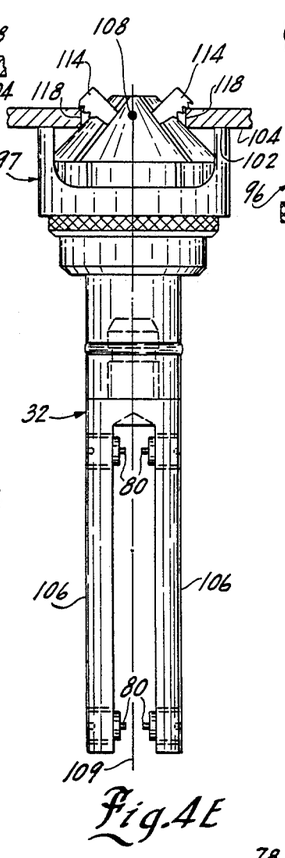

FIGS. 4D and 4E show hole mounting 97 similar to mounting 96 except that they are designed to anchor the post 32 to a hole 118 in the vehicle rather than a protrusion such as a nut. Teeth 114 tighten outward and engage the hole 118. This anchoring means again ensures that the spark gaps 80 define a line 109 that passes through the point 108 to be measured, even if point 108 is an open space. FIG. 4D shows the post 32 anchored to a small hole 118, while FIG. 4E illustrates how the post 32 can be anchored to a larger hole 118.

Figures 4F, 4G:
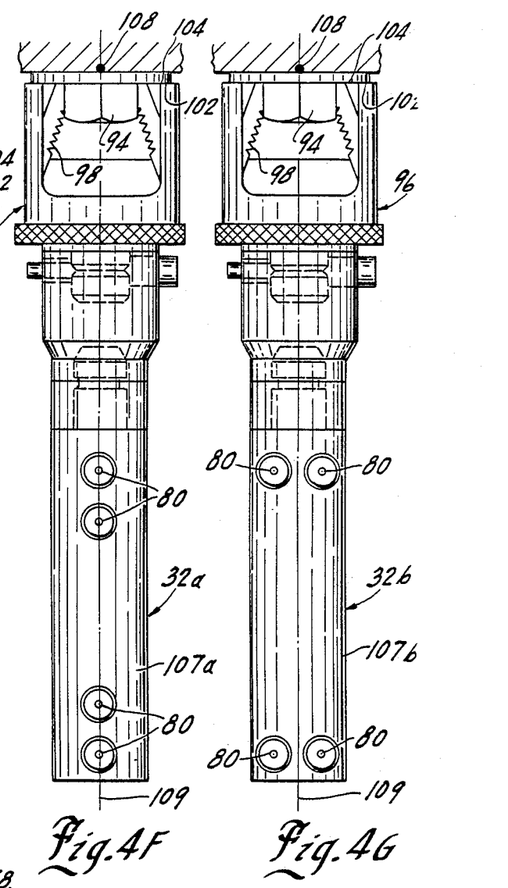
FIG. 4F is a side view of an alternate embodiment of an emitter post with a single support and vertically mounted spark gaps.
FIG. 4G is a side view of an alternate embodiment of an emitter post with a single support and horizontally mounted spark gaps.

Alternate embodiments of the two support configurations of post 32 are shown in FIGS. 4F and 4G. Post 32a in FIG. 4F uses a single support 107a on which to mount the gaps 80. Once again the gaps' centers define a line 109 passing through the point 108 to be measured. In FIG. 4F the gaps 80 are mounted in a vertical fashion and support 107a is attached to amounting 96. In FIG. 4G, the gaps 80 are mounted horizontally to support 107b to form post 32b.

As can be seen from the mounting and configuration of the emitter posts 32, more than a single point can be located using the system. With each emitter post 32 defining two distinct points in three dimensional space, and knowing the relative position of the mounting point 108 on the body, an infinite number of points may be located. Using the emitter posts 32 shown in FIGS. 4A, 4B and 4D-4G, line 109 passing through the two spark gaps 80 and the mounting point 108 is defined. Because the relative positions of these three points is known, any of an infinite number of points on the line 109 can be measured and/or monitored.

Using the emitter posts shown in FIG. 4C, a plane including the two spark gaps 80 and the mounting point 108 is defined. Again, because the relative positions of these three points are known, any of the infinite number of points in the plane can be measured and/or monitored. The points to be measured and/or monitored on these lines and in these planes may be on, in and adjacent to the body. They do not have to be on the body's surface.

Operator Control Unit

As stated above, the operator control unit 40 consists of a CPU 42, a CRT display 44, a printer 46 and an optical decoder 48. In the preferred embodiment, the CPU 42 has 16-bit internal registers and at least 256K memory capability. It preferably has a printer port and three serial communication ports. These three serial communication ports provide access to the CPU for the printer 46, the cable 38 and the optical decoder 48. Cable 38 transmits data drom the controller 56 in each arm 28 to the CPU 42.

Vehicle Reference Data

Figure 5:
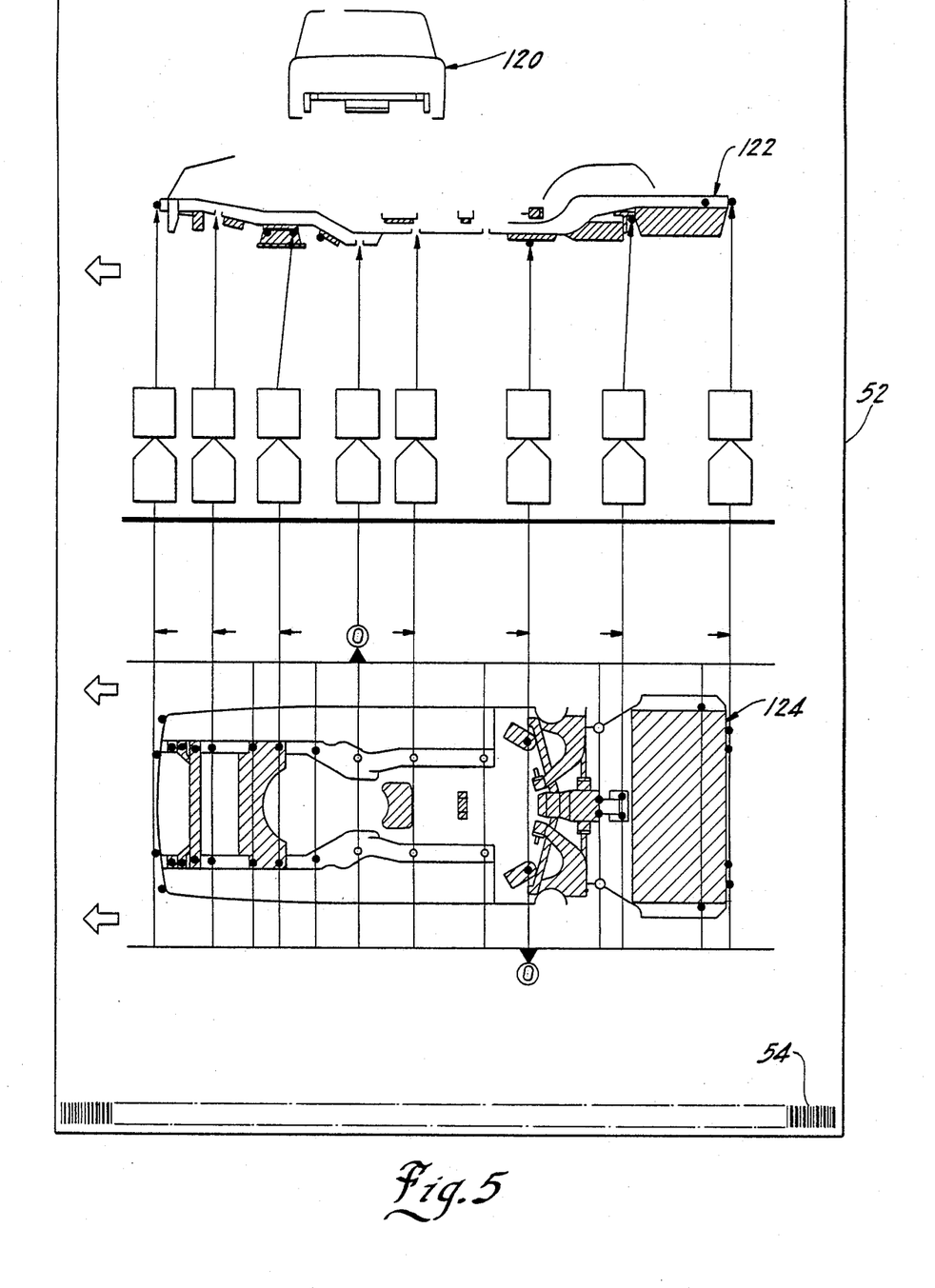
FIG. 5 is a generic example of a reference data sheet of the present invention.

Reference data for each vehicle is provided by a series of data sheets 52. A generic example of such a sheet is shown in FIG. 5. Each sheet 52 in the preferred embodiment will provide the operator with an optically coded set of specification data 54 an end view 120, a side view 122 and a bottom view 124 of the vehicle. As can be seen in FIG. 5, each view will give the operator a graphic perspective of the height (z coordinate) and planar (x, y coordinates) position of each reference point 108. The optical code 54 provides the CPU 42 with the identical data in a form that is more quickly entered into the computer than by manually inputting the data. In an alternate embodiment of the present invention, other data means such as a laser card with optically encoded data may be used to input reference data. An operator, such as a service mechanic, can maintain an extensive library of data sheets or laser cards covering all of the makes and models he or she services.

Operation

The system of the preferred embodiment is initialized when the operator inputs reference data from data sheet 52 to the CPU 42 via optical decoder 48. This lets the system know where the points to compare with the reference data will be measured. In addition, all of the controllers 56 are initialized. As stated above, the circuit illustrated in FIG. 3B is duplicated throughout the system. The operation of one such circuit will be described here for purposes of illustration, with the understanding that all such circuits operate in a similar manner and their coordination is managed by controllers 56 and the CPU 42.

Figure 3A:
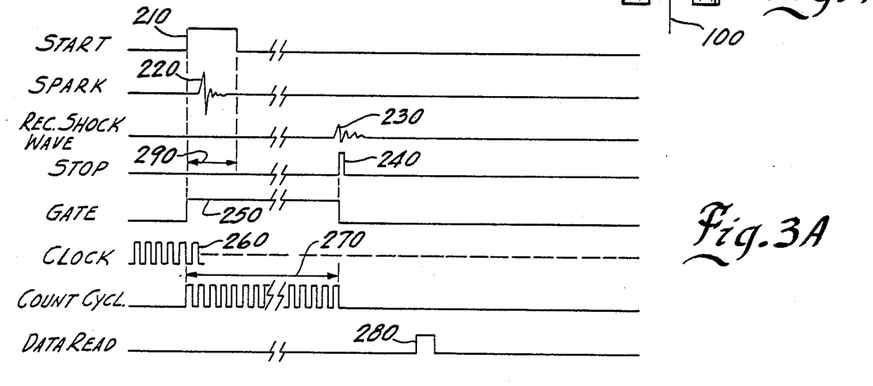
FIG. 3A is a timing diagram of the circuit of FIG. 3B.
Figure 3B:
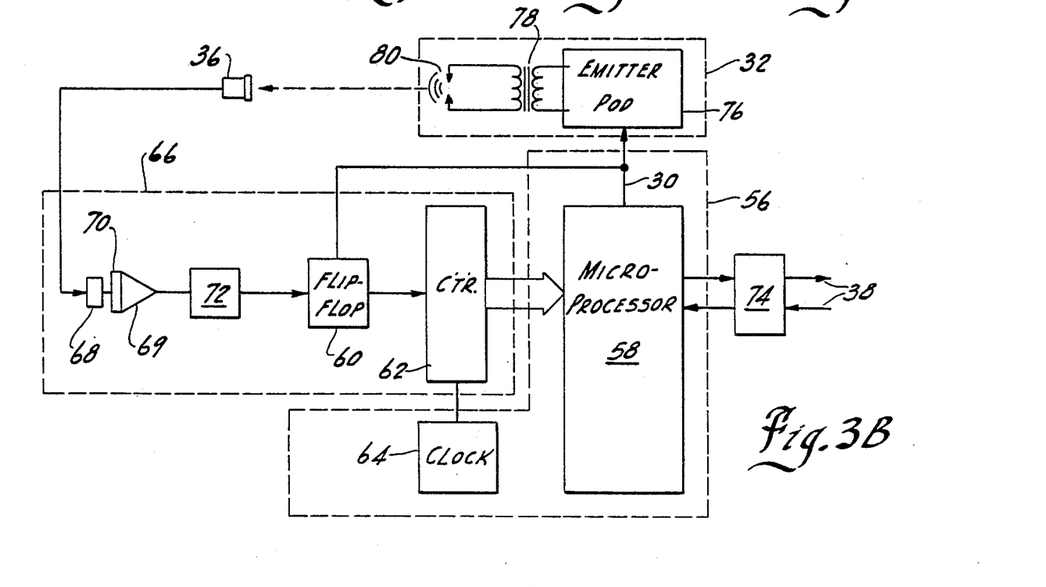
FIG. 3B is a schematic diagram of one of the control circuits of the present invention.

With reference to FIGS. 3A and 3B, the microprocessor 58 initializes the counter 62 after receiving an initialization signal from the CPU 42. Microprocessor 58 then issues a "start" signal 210 to both the emitter pod 76 and the gate flip-flop 60. Emitter pod 76 discharges a capacitor, preferably having a substantial DC charge stored therein into the transformer 78. The transformer 78 generates a spark 220 across gap 80. The generation of spark 220 creates a shock wave having a generally spherical wavefront. This wavefront is picked up by microphone 36 and is converted into an electrical signal 230. The electrical signal 230 is then converted into a "stop" signal 240 fed into the gate flip-flop 60. The "start" signal 210 issued by microprocessor 58 opens a count gate 250 for counter 62 which is closed upon reception of the "stop" signal 240 by flip-flop 60. While gate signal 250 is open (while the shock wave is in transit from spark gap 80 to microphone 36) an external clock 64, preferably operating at a frequency of at least 4 MHz, generates a count pulse train 260 synchronously accumulated by counter 62. Generally, the external clock or pulse generator 64 operates at a frequency considerably higher than the execution rate of instruction cycles in microprocessor 58. This provides the overall system with higher resolution and accuracy than would be available by using the microprocessor 58 alone. The individual counts of the clock 64 and counter 62 of the preferred embodiment resolve into spatial increments of approximately 0.086 millimeters. After the counting is halted by the closing of gate 250, the final count 270 is fed to the microprocessor 58 when the data read signal 280 is generated. A number of calculations are then performed by the microprocessor 58.

The microphones from which the signals are received are chosen by the microprocessor 58. The selection is based on arrival times of the shock waves produced by spark gaps 80. The microprocessor 58 accepts signals from the first three noncollinear microphones 36 that receive the shock wave, rejecting later received signals. The microprocessor 58, when using the alternate equations discussed below and illustrated in FIG. 6D, selects signals from the first four microphones to receive the shock wave where the microphones are arranged so that three are collinear and the fourth is located off of that line.

In the preferred embodiment, an added feature aids in assuring system accuracy. Each shock wave will have a minimum distance to travel between any given gap 80 and an individual microphone 36. During the time it takes the wave to travel this minimum distance, an inhibit period 290 exists. During the inhibit period 290 no "stop" signal can be generated. Therefore, a "stop" signal that might have been triggered as a result of background noise, in a repair shop or garage for example, is prevented.

Figure 6A:
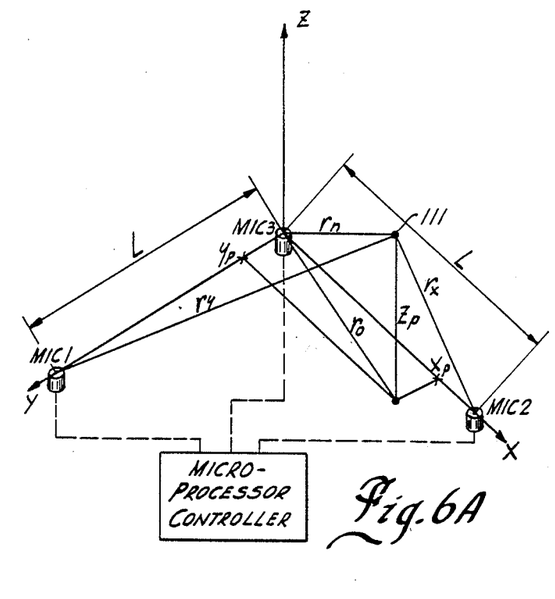
FIG. 6A is a perspective geometric diagram of the quantities measured by the present invention and the relative orientations of those quantities.
Figure 6B:
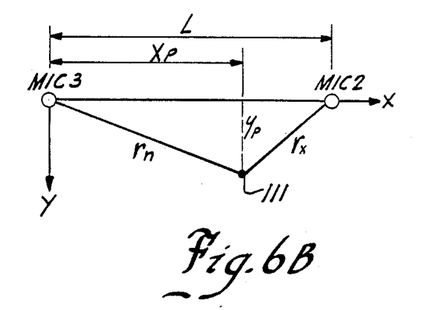
FIG. 6B is a top view diagram of FIG. 6A.
Figure 6C:
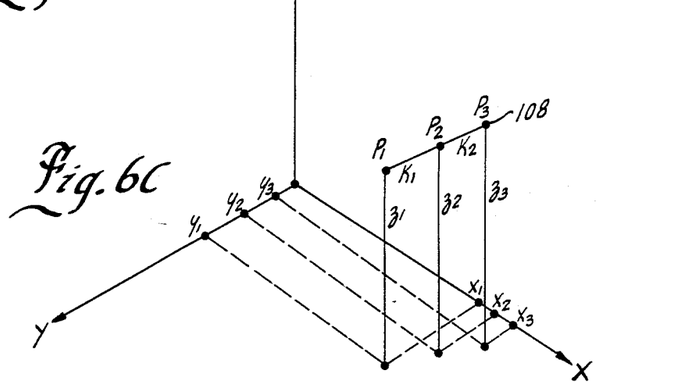
FIG. 6C is a perspective geometric diagram of the measuring configuration used by the emitter posts of FIGS. 4A–4G.

FIGS. 6A–6C help illustrate the basic calculations performed by the microprocessor 58 in processing the raw data provided by the counter 62. In FIGS. 6A and 6B, the position 111 of a spark gap 80 can be determined in terms of the x, y, z coordinates of the point using three noncollinearly placed microphones. These gap position coordinates ($X_p$, $Y_p$, $Z_p$) define the precise location 111 of the spark gap 80. The position of a point so measured is given by the following equations in Equation Set I derived from Pythagorean principles:

Equation Set I
$$X_p = (L^2 + r_n^2 - r_x^2)/2L$$
$$Y_p = (L^2 + r_n^2 - r_y^2)/2L$$
$$Z_p = SQRT[r_n^2 - X_p^2 - Y_p^2]$$

Each emitter post 32 has two such gaps 80. As seen in FIG. 6C, posts 32 are designed so that the distance from the point $P_3$ (or 108) to be measured to the first spark gap center $P_2$ is $K_2$, and from the first gap $P_2$ to the second gap $P_1$ is $K_1$. The end piece 102 of the post 32 must be kept in contact with surface 104 to ensure consistency and accuracy in extrapolated measurements of the points. Using the diagram in FIG. 6C and the equations in Equation Set II the position of the actual point on the vehicle to be measured can be determined. Thus a point to be measured may exist on a surface, in open space or within a solid object and still be accurately measured by the present system. A separate spark gap and microphone receiver are present in each arm 28 and act as a calibrating means 126 (as seen in the cut-away view of FIG. 2B) to account for deviations in the ambient conditions that might affect the speed of sound, and thereby create errors in the distance measurements of the system. The microprocessor 58 compensates for such ambient conditions as well as the circuit time delays in the circuits of FIG. 3B in making the coordinate determinations. The microprocessor 58 additionally takes into account use of a knee element 112 as seen in FIG. 4C and performs statistical filtering and averaging calculations to provide consistent data. The positions of the point to be measured ($P_3$) is thus given by the following equations:

Equation Set II
$$X_3 = X_2 + (K_2/K_1)(X_2 - X_1)$$
$$Y_3 = Y_2 + (K_2/K_1)(Y_2 - Y_1)$$
$$Z_3 = Z_2 + (K_2/K_1)(Z_2 - Z_1)$$

Figure 6D:
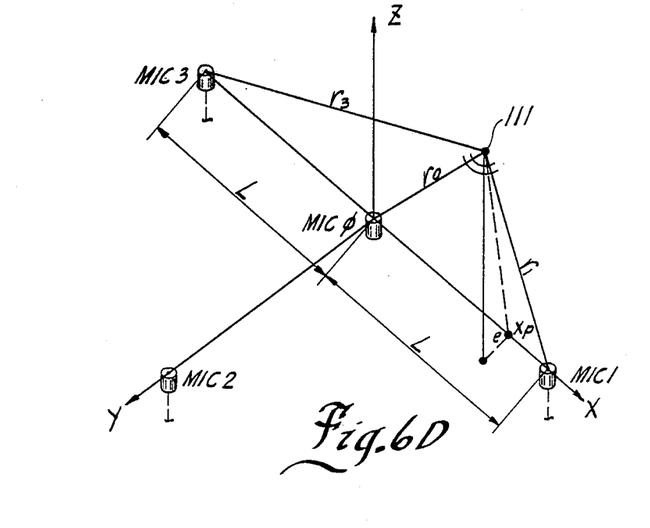
FIG. 6D is a perspective geometric diagram of the quantities measure by an alternate embodiment of the present invention and the relative orientations of those quantities.

In an alternate embodiment, the microprocessor 58 software uses the principles illustrated by the diagram of FIG. 6D. In this configuration, the need for calibrating data is eliminated. The positional data may be generated by the microprocessor 58 with reference only to the travel times measured by the counter 62. As can be seen in the diagram of FIG. 6D, this embodiment requires the addition of another microphone 36 so that there are three linearly placed microphones 36 with known separation distances and a fourth position off the line of the first three. The position 111 of the point is generated, but the velocity of sound (v) can be eliminated with the following equation:

$$V = SQRT[2L^2/(t_3^2 + t_1^2 - 2t_0^2)]$$

Once the microprocessor 58 has generated the data in this form, it is transferred to the communication port 74 and then via cable 38 to the CPU 42. CPU 42 then compares the measured data to the reference data inputted to the optical decodeer 48 for a given vehicle model. The CPU 42 issues commands to the individual controllers 56 to poll various positions and optimize the measuring process.

The CPU 42 provides a numeric comparison of the measured data and reference data in tabular form or a graphic result. The graphic result will be shown from three perspectives, preferably the end, side and bottom views, so that a true three-dimensional representation of any deviation from the reference data can be illustrated. Because of the extremely high accuracy and resolution of the system, closer inspection of the deviation between measured point and reference point may be necessary to determine whether they coincide. Therefore, "zoom" and image rotation features may be incorporated in the software whereby a point or points may be more closely examined. The CPU 42 may also transmit or receive data or results via a modem or other link to or from other computers. The CPU software additionally provides fault-sensing, error-checking and diagnostic functions upon startup and periodically during operation, reporting the results to the operator. When the operator wishes to preserve the data comparison in tabular and/or graphic form, the printer 46 can create a "hard" copy of the comparison.

Figure 7:
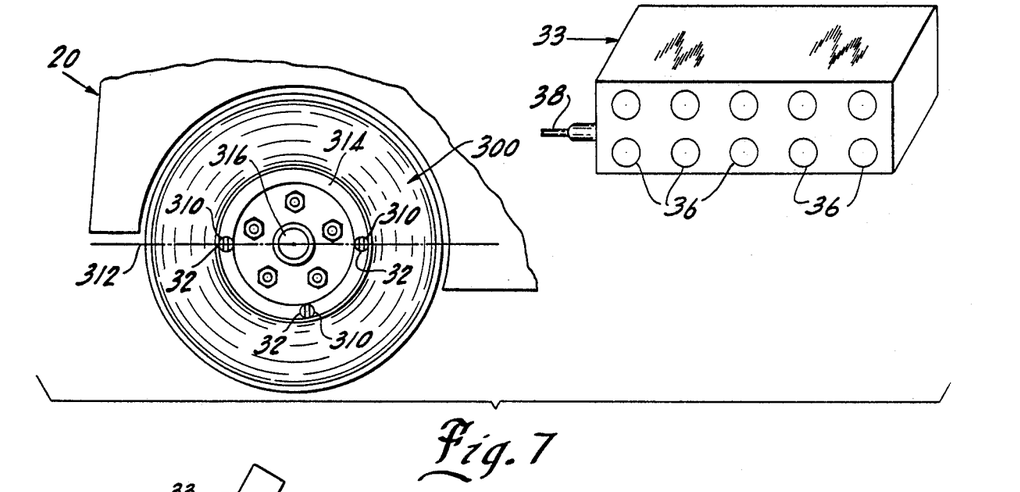
FIG. 7 is a side perspective view of the system of the present invention as used to aid in vehicle wheel alignment.
Figure 8:
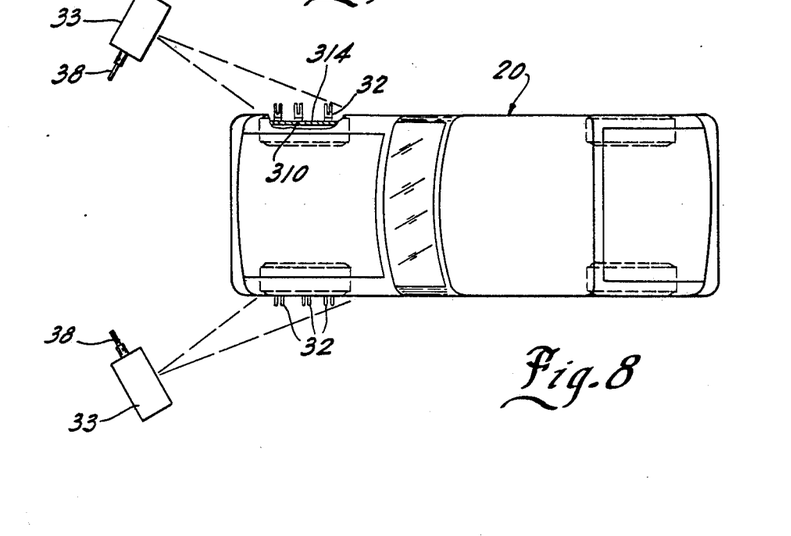
FIG. 8 is a top view of the system of FIG. 7 in use.

In an alternate embodiment, the deviation measurement system of the present invention is used to aid in wheel alignment of a vehicle 20. As seen in FIGS. 7 and 8, three emitter posts 32 are used on each rim 314 of each wheel 300. On the rim 314 are three mounting positions 310. Two of the posts 32 are mounted in a way so that they define a line 312 which intersects the center 316 of rim 314. Thus the section of line 312 between these posts 32 is a diameter of rim 314. The third post 32 is mounted on the rim 314, but not on line 312. Adjacent each wheel 300 is a receiver array 33, similar in configuration and operation to arms 28, towers 27 and modules 29. Arrays 33 transmit data via cables 38 to the CPU (not shown).

From the posts 32 the system can get the positions of the wheel rim centers 316 and the orientations of the planes defined by the rims 314. As with the preferred embodiment, a number of measurements of each point can be made consistently and accurately since the posts 32 need not be removed. The data is then used to assist in computing the seven components of wheel alignment—caster, camber, toe-in, steering axis inclination, turning radius, wheel tracking, and wheel rim run out.

It will be readily apparent and obvious to those skilled in the art that other applications of the basic measuring system exist and that a number of changes and modifications may be made without departing from the spirit and scope of the present invention. For example, the CPU may be programmed to poll the measuring points at regular intervals to provide the operator with constant and consistent feedback of the status of the vehicle body. This closed-loop, real-time feedback would be valuable in the repair and wheel alignment operations. In an alternate embodiment of the present invention, the microphones 36 and spark gaps 80 may be interchanged, the resulting system using the same equipment and equations with no loss of accuracy or resolution. Therefore, the above illustrated and described preferred embodiment is illustrative rather than limiting, the scope of the invention being limited only by the claims that follow.

We claim:

1. A system for determining the spatial position of an infinite number of points on, in and adjacent to a body and comparing one or more of the measured points with corresponding reference points, said system comprising:
   (a) data acquisition means designed to measure the three dimensional positions of an infinite number of points on, in and adjacent to a body, said data acquisition means including,
      (1) at least one emitter means mounted to the body, said emitter means having a plurality of energy signal generators in known spatial relation to one another and the body, to locate an infinite number of points, thereby permitting measurement of positions on, in and adjacent to the body,
      (2) at least three receiver means in optical, electrical and acoustical communication with said generators and spaced apart from the body, said receiver means being in noncollinear relation to one another and further being able to detect the energy signals generated by said emitter means,
      (3) control means designed to cause energy signals to be sent by said emitter means,
      (4) timing means linking said receiver means and said control means and designed to generate a time measurement of the time elapsed from the time the signal is generated by said emitter means until the signal is detected by said receiver means,
      (5) processing means designed to receive the time measurements of said timing means and further designed to convert the time measurements into three dimensional coordinates of the point to be measured, and
   (b) an operator display unit in communication with said data acquisition means designed to compare the measured position with the reference position.

2. The system as disclosed in claim 1 wherein said system further comprises reference data means designed to provide said operator display unit with the reference position with which the measured position is compared.

3. The system as disclosed in claim 2 wherein said reference data means is an optically encoded set of reference coordinates and said operator display unit includes an optical decoder designed to read and decode said optically encoded set of reference coordinates.

4. The system as disclosed in claim 1 wherein each of said generators comprises a spark gap for generating acoustic shock waves detectable by said receiver means.

5. The system as disclosed in claim 1 wherein each of said generators comprises a piezoelectric emitter for generating acoustic shock waves detectable by said receiver means.

6. The system as disclosed in claim 1 wherein said receiver means further comprise an array of individual receivers forming a generally planar grid adjacent the points being measured.

7. The system as disclosed in claim 6 wherein said receiver means further comprise microphone units in noncollinear orientation.

8. The system as disclosed in claim 1 wherein said control means comprises a plurality of microprocessor units, each of said microprocessor units designed to initialize and initiate operation of said timing means and generation of an energy signal by said emitter means, and a central processing unit designed to coordinate said microprocessor units.

9. The system as disclosed in claim 1 wherein said timing means comprises gate means, counting means and external pulse generating means designed to operate so that said gate means is opened when said emitter means generates an energy signal thereby allowing said counter to count pulses generated by said pulse generating means until the signal is detected by said receiving means thereby closing said gate means.

10. The system as disclosed in claim 9 wherein said gate means is a flip-flop, said count means is an electrical counter, and said external pulse generating means is an independent clock pulse generator.

11. The system as disclosed in claim 1 wherein said processing means includes a microprocessor unit programmed to accept the time measurements of said timing means and transmit them to a central processing unit to be converted into the three dimensional coordinates of the point to be measured, said central processing unit also designed to transmit the coordinates to said operator display unit.

12. The system as disclosed in claim 1 wherein said operator display unit comprises a computer programmed to accept the coordinates generated by said processing means and to compare the coordinates to a set of reference coordinates.

13. The system as disclosed in claim 12 wherein said operator display unit further comprises means for visually representing the comparison of the measured coordinates to the reference coordinates.

14. The system as disclosed in claim 13 wherein said visual representation means is a printer.

15. The system as disclosed in claim 13 wherein said visual representation means is a cathode ray tube screen.

16. The system as disclosed in claim 13 wherein said visual representation is a numeric tabular comparison.

17. The system as disclosed in claim 13 wherein said visual representation is a graphic comparison.

18. In an automobile frame or body straightening system including a rack for supporting a vehicle and means to push or pull components thereof, said system including means for determining the location of a series of points on said vehicle, said determining means comprising:
 (a) a plurality of emitter means,
 (b) array mounting means located adjacent the vehicle, said array mounting means having a number of movable arms and position sensor means designed to determine the positions of said arms,
 (c) receiver means including a plurality of microphones spaced apart from said emitter means and mounted on said array mounting means,
 (d) means for causing energy signal emission from said emitter means,
 (e) means for timing energy signal travel from said emitter means to said receiver means and determining the three dimensional coordinates of the point to be measured and calculating and comparing the deviation of the position of a measured point from a reference positio where the reference position data for a point to be measured is inputted for a selected vehicle model, and
means designed to display the deviation comparison to the operator of said system, said display means designed to display the comparison in a graphic format showing two views of the vehicle and comparison so as to give a true three dimensional picture of the position deviation.

19. The system as disclosed in claim 18 wherein the data to be inputted is in the form of optically encoded data capable of being decoded by said system.

20. The system as disclosed in claim 18 wherein the emitter means further comprises one or more spark gaps capable of generating acoustic shock waves detectable by said receiver means, each of said spark gaps being a known distance from the point to be measured.

21. The system as disclosed in claim 18 wherein said system further comprises:
 (f) control means comprising a plurality of microprocessor units, each of said microprocessor units designed to initialize and initiate operation of said timing means and generation of an energy signal by said emitter means, and a central processing unit designed to coordinate said microprocessor units, said timing means comprising gate means, counting means and external pulse generating means designed to operate so that said gate means is opened when said emitter means generates a shock wave energy signal thereby allowing said counter to count pulses generated by said pulse generating means until the energy signal is detected by said receiving means thereby closing said gate means, wherein said gate means is a flip-flop, said count means is an electrical counter, and said external pulse generating means is an independent clock pulse generator, and
 (g) processing means including said microprocessor units programmed to accept the time measurements of said timing means and said central processing unit designed to convert the time measurements into the three dimensional coordinates of the point to be measured and transmit the coordinates to an operator display unit.

22. A system for determining the spatial position of an infinite number of points on, in and adjacent to a body and comparing one or more of the measured positions with corresponding reference positions, said system comprising:
 (a) data acquisition means designed to measure the three dimensional positions of an infinite number of points on, in and adajcent to a body, said data acquisition means including,
  (1) at least one emitter means mountable to the body, said emitter means having a plurality of energy signal generators in known spatial relation to one another and the body to locate an infinite number of points, thereby permitting measurement of positions on, in and adjacent to the body,
  (2) at least four receiver means in optical, electrical and acoustical communication with said generators and located away from the body, said receiver means having three receivers in line with one another and known separations, the fourth of said receivers off of the line formed by the other three, said receivers being able to detect the energy signals generated by said emitter means,
  (3) control means designed to cause energy signals to be sent by said emitter means,
  (4) timing means linking said receiver means and said control means and designed to generate a time measurement of the time elapsed from the time the signal is generated by said emitter means until the signal is detected by said receiver means,
  (5) processing means designed to receiver the time measurements of said timing means and further designed to convert the time measurements into three dimensional coordinates of the point to be measured using calculations that are independent of the velocity of said wavefronts and any deviations due to ambient conditions around the system, and
 (b) an operator display unit in communication with said data acquisition means designed to compare the measured position with the reference position.

23. The system as disclosed in claim 22 wherein said system further comprises reference data means designed to provide said operator display unit with the reference position with which the measured position is compared.

24. The system as disclosed in claim 22 wherein each of said generators comprises a spark gap for generating acoustic shock waves detectable by said receiver means.

25. The system as disclosed in claim 22 wherein said receiver means further comprise an array of individual receivers forming a generally planar grid adjacent the points being measured.

26. The system as disclosed in claim 25 wherein said receiver means further comprise microphone units in coplanar orientation.

27. The system as disclosed in claim 22 wherein said control means comprises a plurality of microprocessor units, each of said microprocessor units designed to initialize and initiate operation of said timing means and generation of an energy signal by said emitter means, and a central processing unit designed to coordinate said microprocessor units.

28. A system for determining the spatial portions of an infinite number of points on, in and adjacent to a body, said system comprising:
 (a) data acquisition means designed to measure the three dimensional positions of an infinite number of points on, in and adjacent to a body, said data acquisitions means including,
  (1) at least one emitter means mountable to the body, said emitter means having a plurality of energy signal generators in known spatial relation to one another and the body to locate an infinite number of points thereby permitting measurement of positions on, in sad adjacent to the body, (2) at least three receiver means in optical, electrical and acoustical communication with said emitter means and spaced apart from the body, said receiver means being in noncollinear relation to one another and further being able to detect the energy signals generated by said emitter means, (3) control means designed to cause energy signals to be sent by said emitter means, (4) timing means linking said receiver means and said control means and designed to generate a time measurement of the time elasped from the time the signal is generated by said emitter means until the signal is detected by said receiver means, and (5) processing means designed to receive the time measurements of said timing means and further designed to convert the time measurements into three dimensional coordinates of the point to be measured.

29. The system as disclosed in claim 26 wherein said system further comprises recording means designed to generate a final compilation of any points measured, said recording means receiving the point coordinates from said processing means.

30. The system as disclosed in claim 26 wherein each of said generators comprises one spark gap capable of generating acoustic shock waves detectable by said receiver means.

31. The system as disclosed in claim 26 wherein said receiver means further comprise an array of microphone units in noncollinear orientation adjacent any points being measured.

32. The system as disclosed in claim 26 wherein said control means comprises a plurality of microprocessor units, each of said microprocessor units designed to initialize and initiate operation of said timing means and generation of an energy signal by said emitter means, and a central processing unit designed to coordinate said microprocessor units.

33. The system as disclosed in claim 26 wherein said timing means comprises gate means, counting means and external pulse generating means designed to operate so that said gate means is opened when said emitter means generates an energy signal thereby allowing said counter to count pulses generated by said pulse generating means until the signal is detected by said receiving means thereby closing said gate means.

34. The system as disclosed in claim 29 wherein said processing means includes a microprocessor unit programmed to accept the time measurements of said timing means and a central processing unit designed to convert the time measurements into the three dimensional coordinates of the point to be measured and transmit the coordinates to said recording means.

35. The system as disclosed in claim 29 wherein said recording means comprises a central processing unit capable of compiling the data provided by said processing means and a printer designed to generate a graphic compilation of the points measured.

* * * * *

UNITED STATES PATENT OFFICE
CERTIFICATE OF CORRECTION

Patent No. 4,811,250　　　　Dated March 7, 1989

Inventor(s) George R. Steber, et al.

It is certified that error appears in the above-identified patent and that said Letters Patent is hereby corrected as shown below:

Col. 3, line 12, delete second occurrence of "issued".

Col. 3, line 36, "uchiyama" should be ---Uchiyama---.

Col. 4, line 2, "June 37, 1978" should be ---June 27, 1978---.

Col. 4, line 31, "systemwhich" should be --- system which---.

Col. 4, line 57, "provide" should be ---provided---.

Col. 5, line 32, "straghtening" should be ---straightening---.

Col. 7, line 36, "beam 28" should be ---beam 26---.

Col. 8, line 9, "conditions" should be ---conditioners---.

Col. 9, line 3, "configuraions" should be ---configurations---.

Col. 9, line 11, "toline" should be ---to line---.

Col. 9, line 33, "amounting" should be ---a mounting---.

Col. 12, line 21, add "where $r_m = t_m * V$ and $t_m$ is a measured time---.

Col. 12, line 28, "decodeer" should be ---decoder---.

Col. 13, line 14, "points" should be ---positions---.

UNITED STATES PATENT AND TRADEMARK OFFICE
CERTIFICATE OF CORRECTION

PATENT NO. : 4,811,250

DATED : March 7, 1989

INVENTOR(S) : George R. Steber, et al.

It is certified that error appears in the above-identified patent and that said Letters Patent is hereby corrected as shown below:

Col. 13, line 35, "mounted" should be ---mountable---.

Signed and Sealed this

Sixteenth Day of April, 1991

Attest:

Attesting Officer

HARRY F. MANBECK, JR.

Commissioner of Patents and Trademarks